Sept. 10, 1963     R. R. BEKKALA ET AL     3,103,209
PHASE ADJUSTING SERVO MECHANISM FOR INTERNAL
COMBUSTION ENGINE AND THE LIKE
Filed March 10, 1961

INVENTORS
Ralph R. Bekkala &
BY Harvey G. Humphries

ATTORNEY

3,103,209
PHASE ADJUSTING SERVO MECHANISM FOR INTERNAL COMBUSTION ENGINE AND THE LIKE

Ralph R. Bekkala, Detroit, and Harvey G. Humphries, Birmingham, Mich., assignors to General Motors Corporation, Detroit, Mich., a corporation of Delaware
Filed Mar. 10, 1961, Ser. No. 94,887
10 Claims. (Cl. 123—65)

This invention relates to servo means for varying the angular relationship between a driving and a driven shaft and is particularly adapted to modify the operative cyclic timing of an associated engine or similar device to regulate or modify the power output or energy absorbing characeristics thereof.

The servo mechanism of the invention has particular application in a two-cycle uniflow scavenged internal combustion engine of the type shown and described in United States Patent No. 2,179,709 to A. F. Brecht, entitled "Internal Combustion Engine," for the purpose of varying camshaft timing of exhaust valve opening, thereby converting the engine from its normal cycle to that of an energy absorbing compressor capable of providing a variable braking action on an associated engine driven load such as a motor vehicle. Although having particular application for such compressive engine braking purposes, the invention is not so limited, being applicable to angular phase adjusting mechanisms generally.

With regard to certain of its more specific aspects, the invention contemplates a combined gear and vane type servo motor capable of substitution in existing camshaft driving gear trains and having valve means associated therewith capable of regulating servo motor adjustment to provide the desired phasing between the engine cam and crankshafts.

The foregoing and other objects, advantages and features of the invention will be apparent from the following description having reference to the accompanying drawing, in which.

Figure 1:
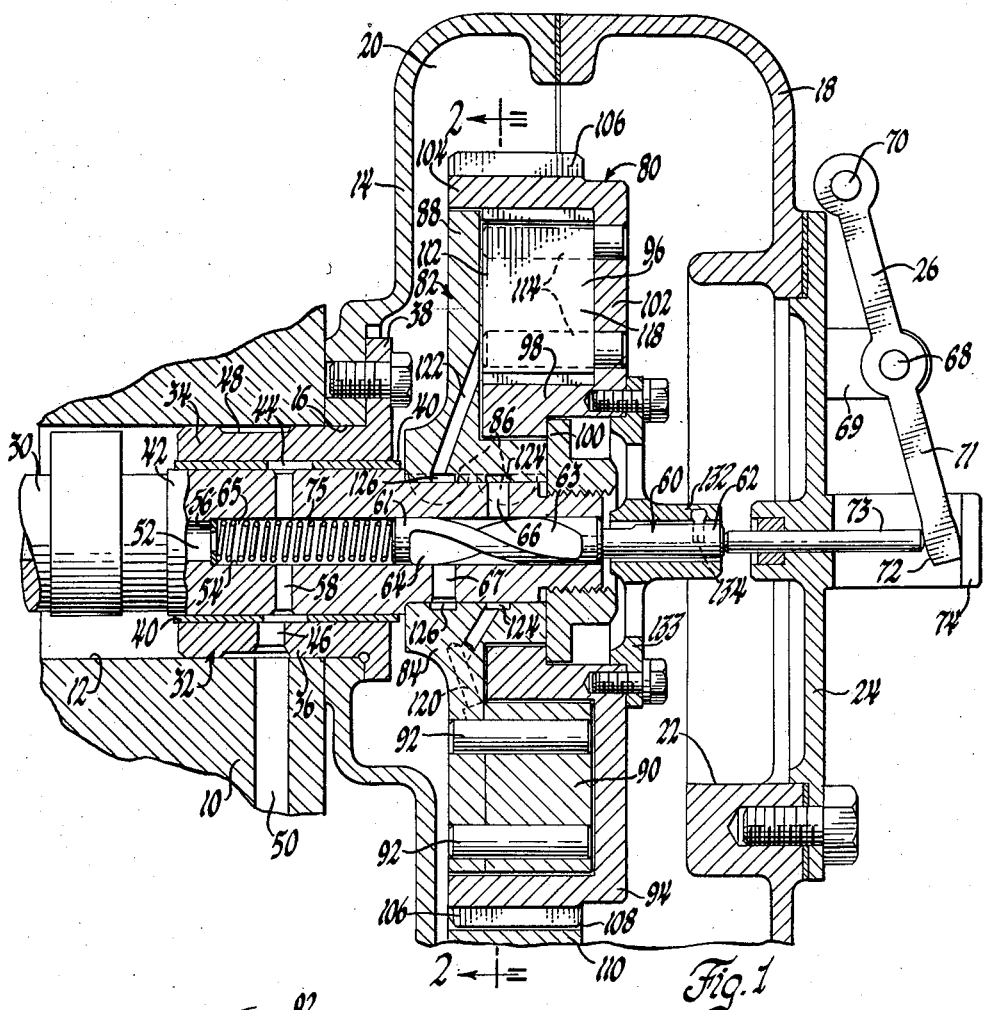
FIGURE 1 is a fragmentary view of a portion of an internal combustion engine incorporating a preferred embodiment of the invention with portions thereof broken away and shown in section substantially in the direction of the arrows and in the plane of the line indicated at 1—1 in FIGURE 2.

Referring more particularly to FIGURE 1, an engine frame member is partially shown at 10 and has a camshaft mounting gallery 12 extending longitudinally therethrough. An end plate 14 is secured to the end wall of the frame member and has an opening 16 mating with the camshaft gallery. A gear housing member 18 is suitably and sealingly secured to the end plate 14 and cooperates therewith to define a gear housing chamber 20. The housing member 18 has an access opening 22 axially aligned with the camshaft gallery. The opening 22 is normally closed by a simple cover plate or by a mounting flange of a camshaft gear driven accessory. In the illustrative embodiment, this access opening is closed by a cover plate 24 which pivotally supports a control lever 26.

A camshaft 30 is rotatably supported within the camshaft gallery by a plurality of longitudinally spaced bearings, one end bearing being shown at 32. This end bearing comprises a bearing support member 34 having a cylindrical sleeve portion 36 slidably embraced by the gallery wall and the end plate opening 16 and having a radial end flange 38 suitably secured to the end plate 14. Two bearing sleeves 40 are axially spaced within the sleeve portion 36 and rotatably support the adjacent camshaft journal 42. An annular groove 44 is defined between the spaced bearing sleeves 40 communicates through a radial port 46 and a circumferential outer groove 48 in the sleeve portion to a pressurized oil supplying passage 50 in the engine frame member. The camshaft 30 is longitudinally drilled at 52 to define an oil distribution gallery connected through radial ports to its several bearings and journal portions. This gallery is counterbored at 54 through its gear housing projecting end and the adjacent end journal portion and connected to the oil pressure supply groove 44 through a spring seating orifice ring or washer 56, the counterbore 54 and radial ports 58 in the camshaft journal portion 42.

Figure 3:
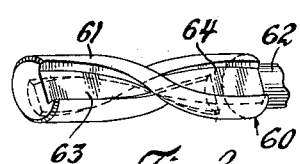
FIGURE 3 is a fragmentary perspective view of the servo controlling valve rotated from its position shown in FIGURE 1.

A valve member 60 is reciprocably and rotatably mounted in and sealing closes the opened end of the camshaft counterbore 54. This valve member is of stepped diameter having a counterbore engaging valve portion 61 at one end and a reduced diameter spindle portion 62 at its opposite end. As best seen in FIGURE 3, the valve portion 61 is helically relieved from opposite ends thereof at 63 and 64 to provide, respectively, a pressure inlet port connected through chamber 65 to the oil pressure supply and an outlet port connected to the gear housing chamber 20 and therethrough to the oil sump of the engine, not shown. Reciprocation and rotation of the valve member relative to its camshaft mounting bore alternately controls the supply and discharge of oil pressure to and from the servo motor device of the invention through two ports 66 and 67 which are spaced longitudinally of the camshaft counterbore and extend radially through the end portion of the camshaft.

The control lever 26 is pivotally supported intermediate its ends by a pin 68 extending between spaced arms 69 projecting from the cover plate 24. One arm of this lever is connected at 70 to a suitable engine phase controlling device, not shown, such as a vehicle brake energizing pedal, an engine throttle control, or an engine or vehicle speed limiting governor. The other arm 71 of the lever 26 is provided with an arcuate cam surface 72 thrustably engaging one end of a valve actuating plunger 73. This plunger is reciprocably mounted in and extends through the cover plate to coaxially and thrustably engage the spindle end 62 of the valve member. Swinging movement of the lever 26 is limited by the cover plate proper and by an angled stop 74 projecting therefrom. The servo controlling movement of the valve and of its actuating plunger are thus limited between extreme camshaft advancing positions and extreme camshaft retarding positions, respectively. A valve return spring 75 is compressively interposed between the spring seating washer 56 and the adjacent end of the valve member in the pressure supply chamber 65. This spring normally acts in conjunction with the supplied oil pressure to bias the valve member against control effecting movement applied through the lever 26 toward its extreme camshaft retarding position wherein the lever arm 68 abuts the stop 74 as shown in FIGURE 1.

In addition to the control valve mechanism defined by the valve member and the camshaft end portion, the phase or engine cycle adjusting servo mechanism of the invention includes a combined camshaft driving gear and servo motor indicated generally by the reference numeral 80. This combined gear and motor comprises a camshaft driving member 82 having a central hub portion 84 drivingly keyed at 86 to the camshaft end portion. A spider portion 88 extends radially outwardly of the hub and carries three equiangularly spaced and radially extending vane or piston members 90. In the illustrative embodiment, these vane members are suitably doweled to the spider portion by two radially spaced pins 92.

A gear member 94 is rotatably mounted with respect to the camshaft driving member and cooperates therewith to define an annular servo motor housing chamber 96. This gear member has a central hub portion 98 which is sealingly journaled and retained on the hub of the camshaft driving member by a flanged nut 100 threadably secured on the end of the camshaft. A wall portion 102 extends radially outwardly of the gear hub in spaced parallel relation to the spider wall 88 and terminates in a peripheral gear and chamber defining cylindrical flange 104. This flange is sealingly journaled with respect to the outer periphery of the spider 88 at its end opposite the wall 102. The flange 104 has a plurality of externally formed gear teeth 106 which are drivingly engaged by the mating teeth 108 of an engine crankshaft driven gear 110.

The gear member wall portion 102 carries three equiangularly spaced and radially extending vane or piston members 112 which are suitably doweled thereto by pins 114. These vanes cooperate with the spider carried vanes 90 to subdivide the annular chamber 96 into a plurality of opposed expansible motor chambers 116 and 118. The several expansible motor chambers 116 and 118 are connected respectively through passages 120 and 122 in the driving member 82 to two annular grooves 124 and 126 which are longitudnally spaced and open inwardly of the hub 84. The grooves 124 and 126 mate with the valve controlled radial ports 66 and 67 in the camshaft end portion.

Figure 2:
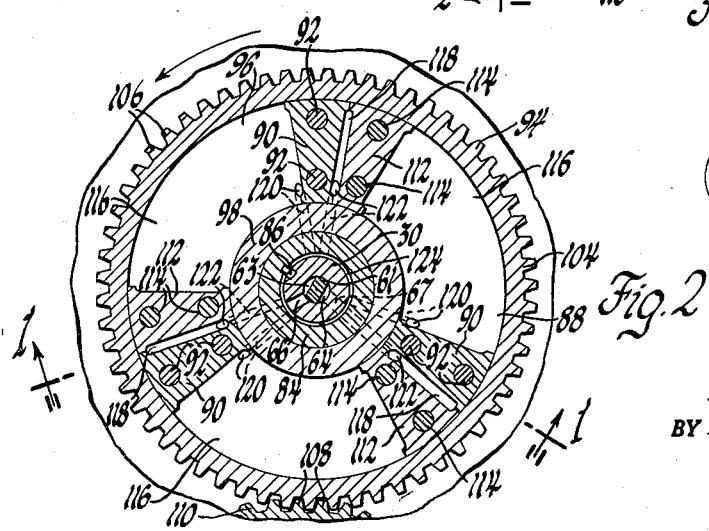
FIGURE 2 is a fragmentary sectional view taken in the direction of the arrows and in the plane of the line indicated at 2—2 in FIGURE 1.

With a counterclockwise direction of camshaft rotation as viewed in FIGURE 2, the expansible chambers 116 and 118 are alternately operable to effect relative rotation between the spider and gear members to either retard or advance the camshaft timed exhaust valve opening in accordance with oil pressures supplied thereto. Such oil pressure supply and timing adjustment is regulated by the effected longitudinal positioning of the valve member 60 which is non-rotatively maintained with respect to the gear member 44 by a guide member 128. This valve guide member is suitably supported with respect to the gear hub 98 by a perforated flange 130 and has a cylindrical hub 132 spacedly embracing and keyed at 134 to the valve spindle end portion 62 thus rotating the valve member with the gear 94.

Under normal engine operating conditions, the valve member 60 is maintained in its camshaft retarding position shown in FIGURES 1 and 2. In this position, the helical valve port 63 serves to supply pressurized oil through the radial port 66, the groove 124 and the passages 122 to the camshaft retarding expansible chambers 116. The fluid pressure thus supplied acts in conjunction with the torque loading imposed on the camshaft by the several exhaust valve and fuel injection actuating mechanisms to maintain the several gear carrying vanes 112 in driving engagement with the spider carried vanes 90. Such driving engagement serves to provide two-cycle engine timing of the several exhaust valves.

In two-cycle internal combustion engines of the type indicated, fuel supply is normally accomplished by pressure injection into the several engine cylinders. The fuel injecting means is normally regulated between no-fuel and full-fuel supply conditions through the operation of a throttle controlled governor between minimum and maximum engine speed limits. When the throttle control is released to its idle speed position while the vehicle is moving and driving the engine at a speed in excess of engine idle speed, the speed responsive mechanism of the governor actuates the fuel supply regulating means to its fuel-off position. Under such conditions, the driven engine absorbs a certain amount of energy and thus tends to brake the vehicle. This braking effect is normally dependent upon the frictional load of the motored engine and the various associated accessory loads, including that of the engine scavenging and charging blower, and to a limited extent upon the energy required to compress the air charge within the several cylinders.

Under two-cycle operation, the energy absorbed in compressing the air charge within the several cylinders of a motored engine is normally limited to the period between the exhaust valve closing at approximately 80° of crankshaft rotation past its bottom center and at the top center position thereof. A substantial portion of this absorbed compressive energy, however, is normally returned to the engine during the initial portion of the subsequent power stroke prior to the opening of the exhaust valve between 85° and 100° of crankshaft rotation past its top center position for each cylinder.

As indicated above, the servo control mechanism 80 is operable to advance the camshaft timing and thus the opening and closing of the several exhaust valves in accordance with the effected positioning of the valve member 60. Such advancing of the exhaust valve timing increases the compression period and the air charge volume subjected to compression and reduces or prevents compressive power return to the engine crankshaft. The engine is thus caused to operate as a variable capacity compressor braking the inertial load of the vehicle.

Limited longitudinal movement of the valve member 60 to the left as viewed in FIGURE 1 by actuation of the control lever 26 brings the helical pressure supply port 63 into communication with the camshaft port 67. Actuating oil pressure is thus supplied to the camshaft advancing expansible chambers 118. At the same time, the helical pressure relieving port opens the camshaft port 66 and thus relieves the oil previously supplied to the several retard expansible chambers 116. This causes camshaft advancing rotation between the driving and gear members 82 and 94 until the ports 66 and 67 are covered by the helical land of the valve member extending therebetween. In this port-closed position, limited leakage occurs permitting pressure to build up on both sides of the several vane or piston members until a balanced fluid pressure is obtained. This balanced pressure condition maintains the camshaft in its adjusted position corresponding to the desired compressive braking effect indicated by the initial positioning of the valve member.

Should additional compressive braking be desired, the valve member may be shifted further to the left with resultant advancing of the camshaft until the ports 66 and 67 are again closed by the valve member and a new equilibrium pressure condition is achieved between the retard and advancing chamber. To reduce the braking effect, the valve member is permitted to return toward its stop limited retard position. Such valve movement to an intermediate valve position results in venting of the several advance chambers and in the supply of oil pressure to the retard chambers until a new equilibrium pressure condition is obtained as the ports 66 and 67 are again closed by the effected camshaft retarding rotation. Such valve movement thus retards the exhaust valve closing and opening and reduces the compressive braking action of the engine.

While the foregoing description has been limited to one illustrative embodiment of the invention having particular application to a compressive engine braking control, it will be obvious to those skilled in the art that various modifications might be made therein and other applications made without departing from the spirit and scope of the invention as defined in the following claims.

We claim:
1. A servo mechanism operable to modulate the power characteristic of an engine comprising a shaft rotatable to sequentially time the power phasing of said engine and having a longitudinally extending bore, means for supplying pressurized oil to said shaft bore, a first vaned member drivingly secured on said shaft, a second engine driven vaned member rotatably mounted with respect to said first vaned member, said first and second members each having angularly spaced radial vanes and cooperating to define a first and second plurality of paired opposing expansible motor chambers, passage means connecting the opposing pairs of said expansible chambers to said shaft bore and opening thereon in longitudinally spaced and angularly disposed ports, and valve means including a valve member reciprocably and rotatably mounted in said shaft bore and drivingly connected to said second member and alternately operable to connect the paired opposing chambers to said pressure supply passage means and to vent fluid pressure therefrom dependent upon the axial positioning of said valve member and the adjusted angular position of said first and second members.

2. In a servo mechanism as set forth in claim 1, means for shifting said valve member longitudinally from a first extreme position wherein pressurized oil is supplied to a first plurality of said expansible chambers and vented from the opposing plurality of expansible chambers to retard the shaft phased timing with respect to the engine driven second member and toward a second extreme position wherein pressure is applied to said second opposing plurality of expansible chambers and vented from said first plurality of expansible chambers thereby advancing the shaft phasing relative to the engine driven second member.

3. In a servo mechanism as set forth in claim 2, said valve member being helically relieved from opposite ends thereof and on diametrically opposite sides thereof to define a helical pressure supply port connected at one end to said camshaft bore and a helical pressure relieving port opening at the opposite end thereof and connectable to an oil sump, and said helical ports being separated by helical pressure sealing lands operable to close said spaced and angularly disposed shaft ports whenever the adjusted angular position of said first and second members corresponds to the effected positioning of the valve member.

4. In a two-cycle internal combustion engine, a servo mechanism operable to modulate the cyclic timing of the engine to regulate the power output and compression characteristics thereof, said mechanism comprising a camshaft rotatable to sequentially time the scavenged exhausting of the several engine combustion chambers and having a bore extending axially from one end thereof, passage means for supplying pressurized oil to said camshaft bore, a first member drivingly secured on said camshaft end, a second engine driven member rotatably mounted with respect to said first member and cooperating therewith to define an annular chamber, said first and second members each having equiangularly spaced radial vanes cooperating to divide said annular chamber into a first and second plurality of paired opposing expansible motor chambers, passage means connecting the opposing pairs of said expansible chambers to said camshaft bore and opening thereon in longitudinally spaced and angularly disposed ports, and valve means including a valve member reciprocably and rotatably mounted in said camshaft bore and drivingly connected to said second member, said valve member being helically relieved from opposite ends thereof and on diametrically opposite sides thereof to define a helical pressure supply port connected at one end to said camshaft bore and a helical pressure relieving port opening at the opposite end thereof and connectable to an oil sump, said helical ports being separated by helical pressure sealing lands, said helical lands and ports being alternately operable to connect the paired opposing chambers to said pressure supply passage means through said camshaft ports, to vent fluid pressure therefrom, and to sealingly close said camshaft ports dependent upon the axial positioning of said valve members and the angular adjusted positioning of said first and second members effected thereby.

5. In a two-cycle internal combustion engine, a servo mechanism as set forth in claim 4, means for shifting said valve member longitudinally from a first extreme postiion wherein pressurized oil is supplied to said first plurality of expansible chambers and vented from the other plurality of expansible chambers to retard the camshaft phased timing with respect to the engine driven means and toward a second extreme position wherein pressure is supplied to said other plurality of expansible chambers and vented from said first plurality of expansible chambers thereby advancing the camshaft phasing relative to the engine driven means.

6. In a two-cycle internal combustion engine, a servo mechanism operable to modulate the power output and compression characteristics of the engine, said mechanism comprising a camshaft rotatable to sequentially time the scavenged exhausting of the several engine combustion chambers and having a bore extending axially from one end thereof, passage means for supplying pressurized oil to said camshaft bore, a first member drivingly secured on said camshaft end, a second member rotatably mounted with respect to said first member and cooperating therewith to define an annular chamber, said second member having external gear formed thereon, engine driven timing gear means drivingly engaging said external gear, said first and second members each having equiangularly spaced radial vanes cooperating to divide said annular chamber into a first and second plurality of paired opposing expansible motor chambers and permitting substantially 90° of angular phase adjustment therebetween, passage means connecting the opposing pairs of said expansible chambers to said camshaft bore and opening thereon in longitudinally spaced and angularly disposed ports, and valve means including a valve member reciprocably and rotatably mounted in said camshaft bore and drivingly connected to said second member, said valve member being helically relieved from opposite ends thereof and on diametrical sides thereof to define a helical pressure supply port connected at one end to said camshaft bore and a helical pressure relieving port opening at the opposite end thereof and conectable to an oil sump and helical pressure sealing lands extending therebetween, said helical ports and lands being operable alternately to supply and vent fluid pressure to and from said opposing chambers through said camshaft ports and to sealingly close said camshaft ports dependent upon the axial positioning of said valve members and the effected angular positioning of said first and second members, and means for shifting said valve member longitudinally from a first extreme position wherein pressurized oil is supplied to said first plurality of expansible chambers and vented from the other plurality of expansible chambers to retard and maintain engine cycle, the phased timing of said camshaft with respect to the engine driven gear means and toward a second extreme position wherein pressure is supplied to said other plurality of expansible chambers and vented from said first plurality of expansible chambers to advance and maintain the camshaft timing to provide compressor cyclic operation of said engine.

7. A servo mechanism operable to modify the angular relation between two rotatably driven members, said members cooperating to define an annular chamber therebetween and each having angularly spaced radial vanes dividing said annular chamber into a first and second plurality of paired opposing expansible motor chambers, one of said members having a bore therein coaxial with its axis of rotation, means for supplying pressurized fluid to said bore, passage means connecting the opposing pairs of said expansible chambers to said bore and opening thereon in longitudinally spaced and angularly disposed ports, a valve member reciprocably and rotatably mounted in the bore of said one member and non-rotatably and drivingly connected to the other of said members, said valve member being helically relieved from opposite ends thereof and on opposite sides thereof to define a helical pressure supply port connected at one end to said bore and a helical pressure relieving port opening to the opposite end thereof, said helical ports being separated by helical pressure sealing lands, said helical ports and lands being operable alternately to supply and vent fluid pressure to and from said opposing chambers through said angularly disposed ports and to sealingly close said ports dependent upon the axial positioning of said valve member and the adjusted angular position of said members.

8. In a servo mechanism as set forth in claim 7, means for shifting said valve member longitudinally from a first extreme position wherein pressurized oil is supplied to a first plurality of said expansible chambers and vented from the second opposing plurality of expansible chambers to retard the angular relation between said members and toward a second extreme position wherein pressure is applied to said second opposing plurality of expansible chambers and vented from said first plurality of expansible chambers thereby advancing the angular relation between said members.

9. A servo mechanism operable to adjust the angular relation between two rotatable members, said members cooperating to define an annular chamber therebetween and each having a radial vane dividing said annular chamber into first and second opposing expansible motor chambers, one of said members having a bore therein coaxial with its axis of rotation, means for supplying pressurized fluid to said bore, passage means connecting each of said expansible chambers to said bore and opening thereon in longitudinally spaced angularly disposed ports, a valve member reciprocably and rotatably mounted in the bore of said one member and non-rotatably and reciprocably connected to the other of said members, said valve member being helically relieved from opposite ends thereof and on opposite sides thereof to define a helical pressure supply port connected at one end to said bore, a helical pressure relieving port opening to the opposite end thereof, and helical pressure sealing lands extending between said helical ports, said helical ports and lands alternately supplying and venting fluid pressure to and from said opposing chambers through said angularly disposed ports and sealingly closing said ports dependent upon the axial positioning of said valve member and the adjusted angular position of said members.

10. A servo mechanism for adjusting the phased driving relation between two rotatable members, said members each having angularly spaced radial vanes and cooperating to define a first and second plurality of opposing expansible motor chambers, one of said members having a bore therein coaxial with its axis of rotation, means for supplying pressurized fluid to said bore, passage means connecting the opposing pairs of said expansible chambers to said bore and opening thereon in longitudinally spaced and angularly disposed ports, the other of said members having an external gear thereon, gear means drivingly engaging said external gear, a valve member reciprocably and rotatably mounted in the bore of said one member and non-rotatably and reciprocably connected to said gear member, said valve member being helically relieved from opposite ends thereof and on opposite sides thereof to define a helical pressure supply port connected at one end to said pressure supplied bore, a helical pressure relieving port opening to the opposite end thereof, and helical pressure sealing lands extending intermediate said helical ports, said helical ports and lands being operable alternately to supply and vent fluid pressure to and from said opposing chambers through said angularly disposed ports and to sealingly close said ports dependent upon the axial positioning of said valve member and the adjusted angular position of said first and second members, and means for shifting said valve member longitudinally from a first extreme position wherein pressurized oil is supplied to a first plurality of said expansible chambers and vented from the second opposing plurality of expansible chambers to retard the phased relation of said one member with respect to the driving gear means and toward a second extreme position wherein pressure is applied to said second opposing plurality of expansible chambers and vented from said first plurality of expansible chambers thereby advancing the phased relation of said one member relative to the driving gear means.

References Cited in the file of this patent
UNITED STATES PATENTS

| 2,132,486 | Lichte | Oct. 11, 1938 |
| 2,466,415 | Greenland | Apr. 5, 1949 |
| 2,787,987 | Portmann | Apr. 9, 1957 |
| 2,958,315 | Williams | Nov. 1, 1960 |